Dec. 2, 1969  G. L. CAPRIO  3,482,153
TRIMMER CAPACITOR
Filed July 24, 1967
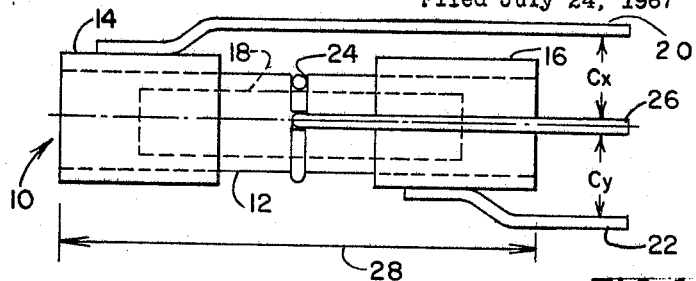
FIG. 1
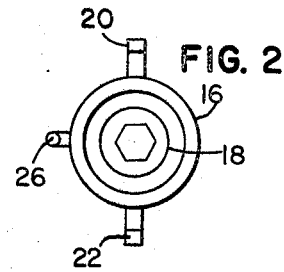
FIG. 2
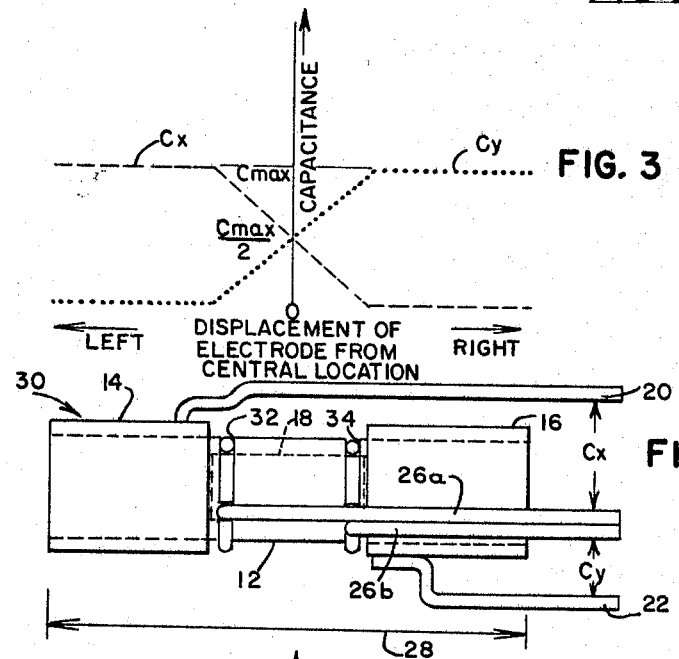
FIG. 3
FIG. 4
FIG. 5
Inventor
GERALD L. CAPRIO
BY Mueller, Aichele & Rauner
ATTYS.

United States Patent Office 3,482,153
Patented Dec. 2, 1969

3,482,153
TRIMMER CAPACITOR
Gerald L. Caprio, Mount Prospect, Ill., assignor to Motorola, Inc., Franklin Park, Ill., a corporation of Illinois
Filed July 24, 1967, Ser. No. 655,423
Int. Cl. H01g 5/00
U.S. Cl. 317—249    3 Claims

ABSTRACT OF THE DISCLOSURE

A pair of axially spaced stationary electrodes are mounted on an elongated hollow form. An axially movable electrode is mounted within the form to provide one capacity between one of the stationary electrodes and the movable electrode, and another capacity between the other stationary electrode and the movable electrode.

Background of the invention

In a signal transmission system with a pair of conductors balanced to ground, it is often necessary to make a fine adjustment of the reactance from one conductor or the other to ground in order to preserve the balance. This may be accomplished by connecting a pair of variable capacitors across the conductors and grounding their junction. It is more convenient, however, to use a presently known air variable selective trimmer capacitor which consists of two opposite quadrant stator plates in one plane and a grounded single quadrant rotor plate in another plane. When the rotor plate is in one of the quadrants between the two stator plates, the capacitance of the rotor plate to either of the stator plates is at a minimum. Rotary motion away from such a position maintains a minimum capacitance to one of the stators while increasing the capacitance to the other stator. Such a capacitor is usually costly and therefore undesirable.

Other applications may require the use of a differential capacitor which is adjustable to increase the capacitance between one conductor and ground and simultaneously and proportionately decrease the capacitance between the other conductor and ground. A prior art device for attaining this result consists of adjacent quadrant stator plates to be connected to the signal conductors and a grounded single quadrant rotor plate. Again, such a device is costly.

Summary of the invention

It is, therefore, an object of this invention to provide an inexpensive trimmer capacitor which, depending on its dimensions may operate either as a selective trimmer or a differential trimmer.

In brief, the trimmer capacitor according to the invention includes a support having a hollow interior and first and second axially spaced electrodes fixedly mounted on the support. An axially movable electrode is mounted within the hollow interior and inwardly spaced from the first and second electrodes in order to be located at various positions along the axis of the support to provide a first capacitance between the first and movable electrodes determined by the degree of communication therebetween and to simultaneously provide a second capacitance between the second and common electrodes determined by the degree of communication therebetween.

Description of the drawing

FIG. 1 schematically illustrates a side view of one of the embodiments of the invention;

FIG. 2 schematically illustrates an end view of the capacitor of FIG. 1;

FIG. 3 illustrates the capacitance variance characteristic of the embodiment of FIG. 1;

FIG. 4 illustrates a second embodiment of the invention; and

FIG. 5 illustrates the capacitance variance characteristic of the embodiment of FIG. 4;

Detailed description of the preferred embodiments

Referring now to FIGS. 1 and 2, the capacitor 10 includes an elongated tubular support or form 12 composed of a dielectric material and a pair of stationary electrodes 14 and 16 encircling respective end portions of the support 12 and axially spaced from one another. A piston or inner electrode 18 is axially movable within the hollow interior of the support 12 and in order to provide better retention at a given capacitor setting, it is preferable that the electrode 18 be threaded in order to mate with tapping on the support 12. Leads 20 and 22 respectively provide electrical contact to the electrodes 14 and 16. A semi-circular slot 24 is cut out of the support 12 and a lead 26 is bent around and into the slot and operatively connected to the electrode 18 in order to make continuous contact therewith. The capacitance between leads 20 and 26, hereinafter referred to as $C_x$, is proportional to the distance that electrode 18 extends within electrode 14 or in other words the degree of communication between them. Similarly, the capacitance $C_y$ between leads 22 and 26 is proportional to the distance that electrode 18 extends within electrode 16 or the degree of communication between them. Thus, for example, when electrode 18 is moved to the left, the degree of communication between it and electrode 14 increase to increase $C_x$ while the degree of communication between electrodes 16 and 18 decreases to decrease $C_y$. In order that the maximum values of $C_x$ and $C_y$ be the same, the axial lengths of the stationary electrodes 16 and 14 should be equal.

If the axial length of the electrode 18 plus the axial length of one of the stationary electrodes is equal to the length 28 between the extremities of the electrodes 14 and 16, then the capacitor 10 will have a differential operation, that is, an increase in $C_x$ (or $C_y$) results in an equal decrease in $C_y$ (or $C_x$). In such case, when electrode 18 is centrally located as shown, it will extend half way into each of the stationary electrodes and therefore $C_x$ and $C_y$ will have one-half their maximum values. When the electrode 18 is axially moved to the left to a position where its left hand extremity is aligned with the left hand extremity of electrode 14, $C_x$ will have a maximum value and $C_y$ will be zero. And when electrode 16 is moved to the right to a position where the right hand extremities of electrodes 16 and 18 are aligned, $C_y$ will have a maximum value and $C_x$ will be zero. This characteristic is shown in FIG. 3 where the dotted line represents $C_y$ and the dashed line represents $C_x$ for various axial positions of the electrode 18. When the electrode is centrally located as represented by O, both $C_x$ and $C_y$ are equal to $C_{max}/2$. Since the value of $C_{max}$ is determined by the axial length of the stationary electrodes 14 and 16, theoretically they will have the greatest values when such axial lengths are slightly less than one-half the length 28, and when the length electrode 18 is slightly greater than length 28. However, this may increase the fringing between electrodes 14 and 16 to a point where the capacitor would have no practical use.

If the length of electrode 18 is decreased while maintaining the length of the stationary electrodes, then when the electrode 16 is centrally located, $C_x$ and $C_y$ will remain equal but will have values less than one-half their maximum values. If as shown in FIG. 4, the length of electrode 18 is shortened to the point where it is equal to the spacing between electrodes 14 and 16, then the capacitor will have a selective operation. That is, the capacitance on one side would be variable while the capacitance on the other side would have a value of zero. In such case, if the electrode 16 is centrally located, it will not communicate with either of the stationary electrodes and therefore $C_x$ and $C_y$ will be zero. When the electrode 18 is axially moved to the left to a position where its left hand extremity is aligned with the left hand extremity of electrode 14, $C_x$ will have a maximum value and $C_y$ will remain zero. Movement of electrode 18 to the right to align the right hand extremity with the right hand extremity of electrode 16 will cause $C_x$ to be zero and $C_y$ to be a maximum. This characteristic is shown in FIG. 5.

In order to provide the greatest $C_{max}$ the length of the electrode 18 should be equal to the lengths of the stationary electrodes and therefore each would be equal to one-third the total length 28. If the electrodes 14 and 16 were any longer, electrode 18 would be shorter and therefore it would not have enough length to entirely communicate with the stationary electrodes. Two slots 32 and 34 and two leads 26a and 26b respectively mounted therein provide continuous contact with the movable electrode 18.

The FIG. 4 construction may be used in a signal transmission system having a pair of conductors balanced to ground in order to make fine adjustments of the reactance from one conductor or the other conductor to ground in order to preserve the balance. The leads 20 and 22 are respectively connected to the signal conductors. By displacing the movable electrode 18 in one direction, the capacitance between one signal conductor and ground may be varied while the capacitance between the other signal conductor and ground is maintained at zero.

With the type of contact made with the electrode 16 it would be necessary to make it slightly longer than the spacing between the stationary electrodes in order that it make contact with the leads 26a or 26b. Other means to make contact may be used, however, in which case this would not be necessary.

In either of the embodiments, the capacitor may be constructed rather small and inexpensively whereas the prior art air rotary variable type requires a relatively costly structure.

I claim:
1. A trimmer capacitor including in combination:
   a cylindrical dielectric support having a hollow interior with an axis extending through the interior;
   first and second cylindrical electrodes fixedly mounted on the exterior of the dielectric support and axially spaced from one another;
   a common electrode of a generally cylindrical shape and axially movably mounted within the hollow interior of the dielectric support for location at various positions along the axis of the support to provide a first capacity between the first and the common electrode determined by the degree of communication therebetween, and to provide a second capacity between the second and the common electrode determined by the degree of communication therebetween;
   a central portion on the dielectric support cylinder between the first and second electrodes, with a slot through the central portion;
   a first conductor mounted in the slot and restrained against axial movement thereby, said first conductor making continuous contact with the common electrode for providing an external connection therefor; and
   second and third conductors connected, respectively, to the first and second electrodes for providing external connections therefor.

2. The trimmer capacitor set forth in claim 1 wherein the length of said common electrode is equal to the spacing between said first and second electrodes to cause said first and second capacities to be at a minimum when said common electrode is located at an axially central position.

3. The trimmer capacitor set forth in claim 1 wherein said common electrode has a length equal to the spacing between said first and second electrodes plus the length of said first electrode to cause said first and second capacities to be one-half their maximum values when said common electrode is at an axially central position.

References Cited

UNITED STATES PATENTS

| | | |
|---|---|---|
| 2,426,905 | 9/1947 | Billiard. |
| 2,567,280 | 9/1951 | Foster. |
| 2,589,092 | 3/1952 | Kihn. |
| 2,728,052 | 12/1955 | Van Duyne. |
| 2,745,961 | 4/1956 | Pan. |

FOREIGN PATENTS

| | | |
|---|---|---|
| 420,055 | 11/1934 | Great Britain. |
| 541,712 | 12/1941 | Great Britain. |

OTHER REFERENCES

Variable Capacitors and Trimmers, Dummer, G. W. A. Pitman & Sons, London, 1957, pp. 86 and 100 relied on.

E. A. GOLDBERG, Primary Examiner